N. D. LEVIN.
MINING MACHINE.
APPLICATION FILED JUNE 28, 1911.
1,247,420.
Patented Nov. 20, 1917.
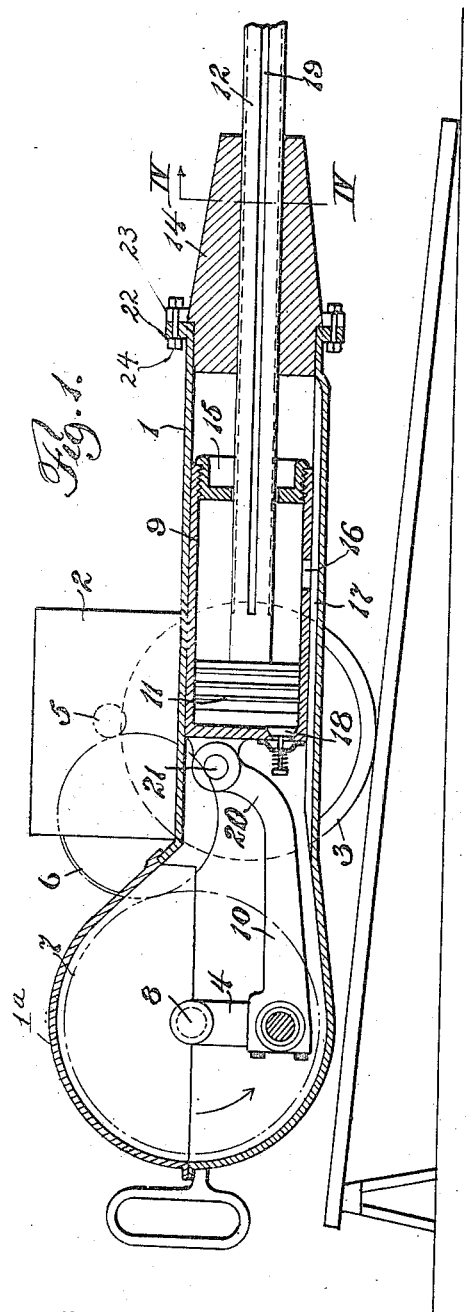
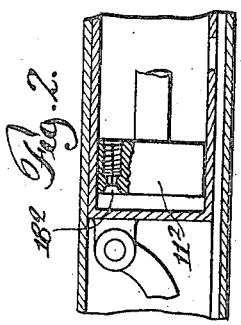
WITNESSES
INVENTOR
N. D. Levin
by atty
Paul Synnestvedt

UNITED STATES PATENT OFFICE.

NILS DAVID LEVIN, OF COLUMBUS, OHIO, ASSIGNOR TO THE JEFFREY MANUFACTURING COMPANY, OF COLUMBUS, OHIO.

MINING-MACHINE.

1,247,420.  Specification of Letters Patent.  Patented Nov. 20, 1917.

Application filed June 28, 1911. Serial No. 635,843.

*To all whom it may concern:*

Be it known that I, NILS D. LEVIN, a citizen of the United States, residing at Columbus, in the county of Franklin and State of Ohio, have invented certain new and useful Improvements in Mining-Machines, of which the following is a specification.

The invention relates to reciprocating drill machines, such as are used in the mining of coal. It has for one of its objects to make more compact, and to advantageously arrange, the parts of a wheel mounted mechanism of this class, having an electric motor and a reciprocating drill or punching device, which is actuated by a piston and a reciprocating cylinder driven by the motor. Another object is to provide a constant body of relatively clean air to serve as the medium for transferring reciprocatory movements to the piston from the rotary movements of the parts driven by the motor; and also to provide a support for the reciprocating tool rod that will hold it in alinement in a superior way, and avoid the cramping and binding, which have been incident to mechanisms of this class.

Figure 1 is a longitudinal section through a machine embodying the invention,

Fig. 2 is a side elevation, partly in section, of a modified form of piston which may be employed, and Fig. 3 is a section taken on the line IV—IV of Fig. 1.

In carrying out my invention I provide a casing comprising a forwardly projecting main cylinder 1 and the crank case, proper, 1ª, both supported by a pair of wheels 3 in the usual manner and provided with a motor 2, preferably electric, placed substantially above the axis of the wheels, to secure proper distribution of weight. Within the main cylinder 1 is the crank 4 from which the reciprocatory parts are driven, said crank being driven by the speed reducing gears 5, 6 and 7 and the crank shaft 8. In the forward part of the main cylinder, I have mounted a cylinder 9 operated from the crank 4 by the connecting rod 10. Slidable in the cylinder 9 is a piston 11 and piston rod 12, said piston rod carrying a tool 13 and being secured to the piston 11 at the other end, in the usual manner. In order to secure facility in assembling the machine, I have provided the main cylinder 1 and the cylinder 9 open at their front ends, the main cylinder 1 having detachably mounted at said end, the guide block 14, and the cylinder 9 being closed by the cap 15.

Intermediate the ends of the cylinder 9, and adjacent its forward end, I have provided a port 16, which port is in constant communication with an air space 17, intermediate the bottom of the cylinder 9 and the bottom of the main cylinder. At the rear end of the cylinder 9 I have provided an inwardly opening check valve 18. The port 16 serves as a means for replenishing the air on both sides of the piston 11, and on the forward stroke of the cylinder the momentum of the piston and the parts carried thereby carries the piston a sufficient distance to the front of the position illustrated to permit the admission of air through the port 16 and to the rear of the piston 11. The air compressed on the front side of the piston 11 serves to cushion the movement of the parts and prevents the piston from striking the front end of the cylinder. In the forward movement of the piston and cylinder, the air behind the piston is compressed, and, at the end of the stroke, the power thus stored is utilized to give the tool a powerful, yielding blow. To prevent the piston rod 12 and the tool carried thereby from rotating I have provided four key seats 19 cut on quarters on the piston rod and fitting keys in the guide block 14. There is a slight clearance between the cap 15 in the end of the cylinder 9, and the piston rod 12, said clearance being provided in order to prevent the piston rod from sticking between the two bearings already provided for it. It will be noted however that such clearance is so slight that the cushioning effect of the air at the front of the cylinder 9 is not lost. This clearance about the rod 12 is of importance for the reason that, in actual practice great difficulty is often experienced with machines of this type not having this clearance. This is due to the fact that it is very difficult and often impossible, to keep three bearings in exact alinement. If any one of the three bearings becomes displaced it results in binding of the piston rod with the consequent unsatisfactory operation of, and injury to, the machine. I have avoided these difficulties by eliminating the central bearing thus doing away with the friction incident to the reciprocation of the piston rod through the cylinder, which effects an appreciable saving in power and reduces to a minimum the possibility of binding of the rod.

By the provision of the passage 17 I have done away with the necessity of a port opening to the atmosphere, a feature that is undesirable in that the air, where a machine of this type is working, is dusty and grit is apt to be sucked into the machine. By this arrangement the air in the casing of the machine is free to flow through the passage 17 from the crank chamber to the front end of the main cylinder 1 and back again, as the cylinder 9 is being reciprocated, the same air being thus used again and again, thereby eliminating the necessity of taking in fresh supplies of outside gritty air.

The valve 18 assists in permitting the piston to maintain its proper position in case it has worked too far to the rear in the cylinder 9. This condition arises when the machine has rested idly upon the platform for some time, the machine working downward on the platform while at rest, and the piston moving to the rear of the cylinder, due to leakage about the piston. In the absence of the valve 18 a great amount of force is necessary to drag the piston forward to the position illustrated in Fig. 1, and if the machine is started without dragging the piston forward there is practically no air pressure behind the piston, and a large part of the effectiveness is lost. By the use of the valve 18 this difficulty is obviated, inasmuch as the valve moves inwardly, permitting the passage of air behind the piston, when the piston, by virtue of its inertia, is carried forward at the end of the forward stroke of the cylinder. The valve thus permits the piston to assume its proper position in the cylinder, regardless of the position of the piston in the cylinder at the time the machine is started. It will be understood that the valve 18 can also act while the machine is in operation. On the forward working stroke, when the piston 11 is forced relatively backward, there will be some loss of air by leakage around the piston. On the backward return stroke there is a tendency to form a partial vacuum corresponding in degree to the amount of air lost as aforesaid by leakage. The formation of this vacuum is prevented by the admission of air automatically through the valve 18 from the interior of the casing.

By providing the air passage 17 at the bottom of the casing 1 I secure an added advantage in that the passage may also be utilized as a means for oiling the machine, for oil placed within the casing 1 will be splashed over the inside of the machine during operation, and a portion sucked up through the port 16 from the passage 17 into the cylinder 9, thus affording an automatic lubrication.

It will be observed that the center of the crank shaft 8 is above the center of the cylinder 9 and that the connecting rod 10 is provided with the curved or off-set portion 20. It will also be seen that the crank case 1ª is so situated that its lower wall is in a horizontal plane near the horizontal plane of the bottom of the main cylinder 1, and that the upper wall of the crank case is angulated upward sharply at the transverse plane of the rear end of the motor. The object of this arrangement is to lower all of the parts of the operating mechanism in relation to the wheels 3 so that the cutting apparatus can be brought to bear on the coal at lines as low as possible and yet have the pick or punch tool move on approximately horizontal lines. The axis of the cylinders is in the axis of the wheels. The pitman 10 is connected to the reciprocating cylinder at an axis near the top of the latter and nearly in the horizontal plane of the crank shaft. The deflecting or bending of the crank allows the pitman to move through the upper and lower parts of its stroke freely without impinging upon either the upper or lower part of the casing wall. By providing the center of the crank shaft 8 above the center of the pin 21 on the cylinder, a very good working angle is secured for the connecting-rod when the cylinder is moving forward under pressure, and at the same time a good angle secured for the rear movement. The head is secured to the main cylinder 1 by means of the lugs 23 and 22 carried by these parts and the bolts 24.

Fig. 2 illustrates a modified form of construction of piston, the piston 11² in this case being provided with the inwardly opening check valve 18². When this piston is used the arrangement of the other parts is of course precisely the same as that of Fig. 1, with the exception that the check valve 18 is omitted, the check valve 18² taking its place.

Various other modifications can obviously be made without departing from the spirit of my invention.

My invention thus secures a neat, compact machine, together with features most favorable to successful operation, and wherein wear is reduced to a minimum. These and such other advantages as may be incidental to my invention will readily occur to those familiar with the art.

Having thus described my invention and illustrated its use, what I claim as new and desire to secure by Letters Patent is the following:—

In a coal drilling mechanism adapted to be held to its work by an inclined platform, the combination of two supporting wheels, an electric motor mounted in substantial balance in relation to the axis of the wheels and above it, a longitudinally arranged main cylinder mounted on said wheels with its axis in or near the axis of the wheels and extending from a plane relatively near the rear periphery of the wheels to a plane considerably in advance of the wheels, a reciprocating piston adapted to have its rod connected to a drill tool, a reciprocating cylinder within the main cylinder and containing said piston, a crank shaft on an axis in a plane above the axis of the piston, a train of gearing extending from the motor above the wheel axis to the crank shaft, a crank carried by said shaft, a casing having its lower wall in a horizontal plane relatively near that of the bottom of the main cylinder and its upper wall sharply angulated to the horizontal plane of the upper wall of the cylinder, at the transverse plane of the rear end of the motor, a pitman pivoted to the rear end of the reciprocating cylinder on an axis near the top of the cylinder and curved or bent to permit its vertical reciprocations without impingement upon either the upper wall or the lower wall of the crank casing.

In testimony whereof I have signed my name in the presence of the two subscribed witnesses.

NILS DAVID LEVIN.

Witnesses:
F. C. COSEO,
R. R. DUNLOP.

Copies of this patent may be obtained for five cents each, by addressing the "Commissioner of Patents, Washington, D. C."